July 16, 1946.　　　R. R. TREXLER　　　2,404,258
LIQUID DISPENSING APPARATUS
Filed Dec. 9, 1942　　　3 Sheets-Sheet 1
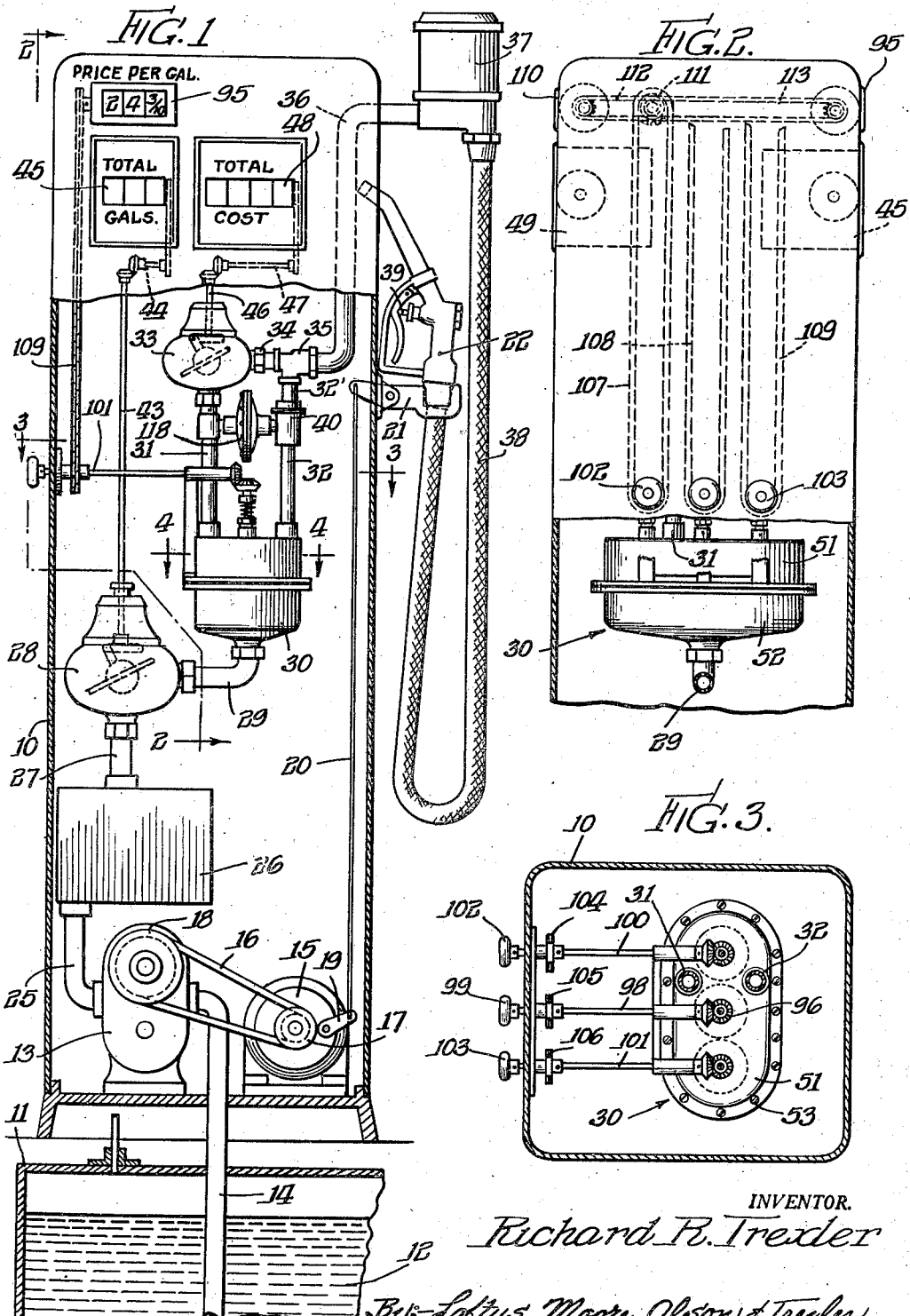
INVENTOR.
Richard R. Trexler
By Loftus, Moore, Olson & Trexler
attys.

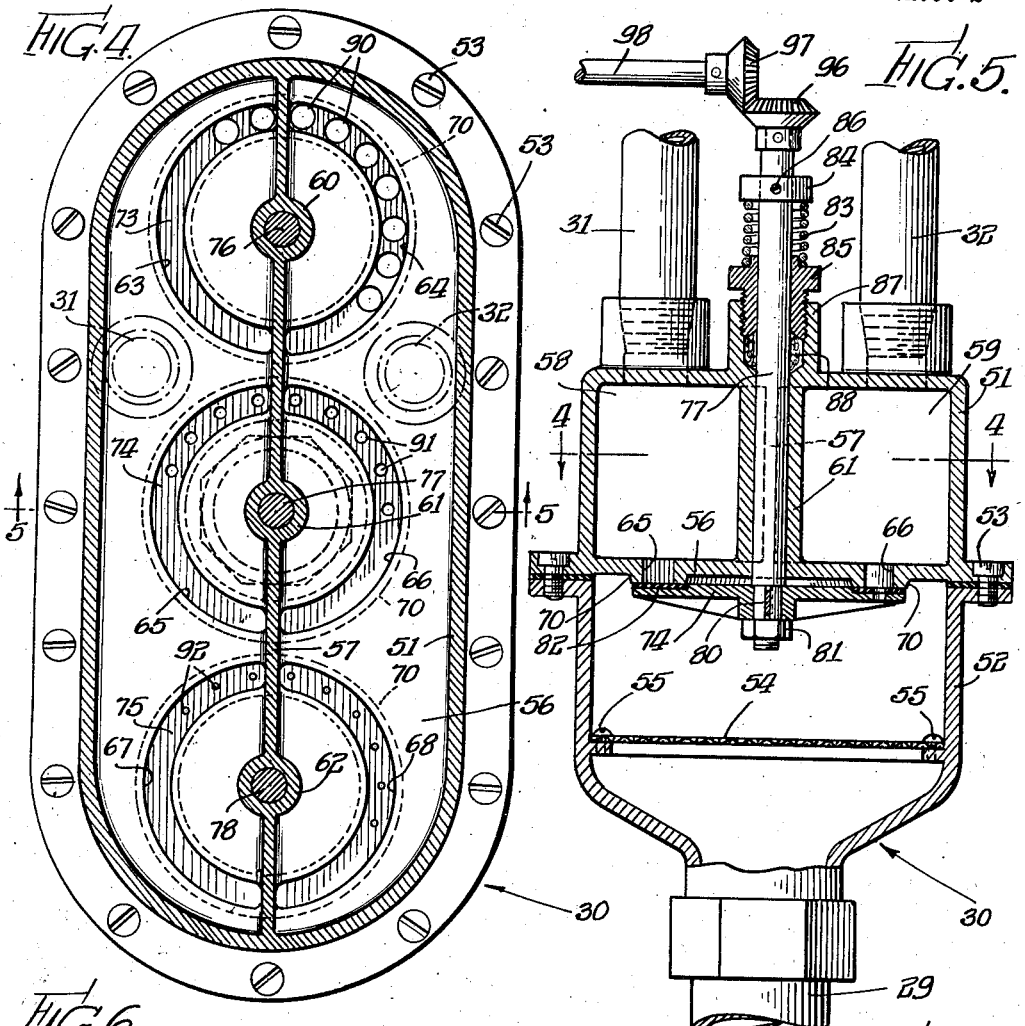

July 16, 1946.　　　R. R. TREXLER　　　2,404,258
LIQUID DISPENSING APPARATUS
Filed Dec. 9, 1942　　　3 Sheets-Sheet 3
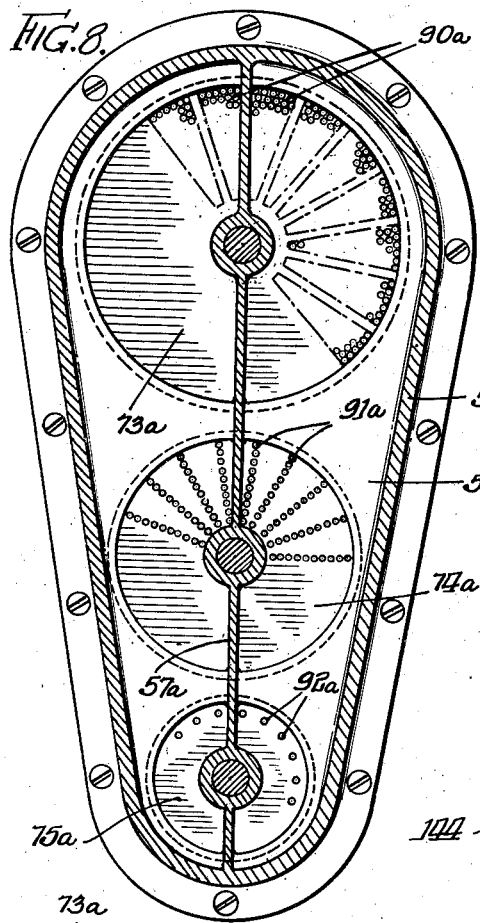
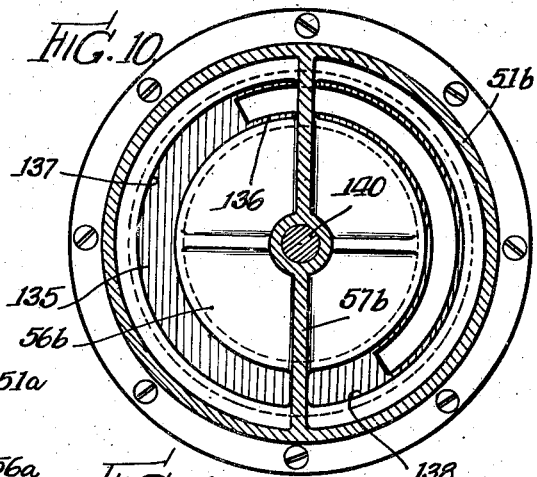
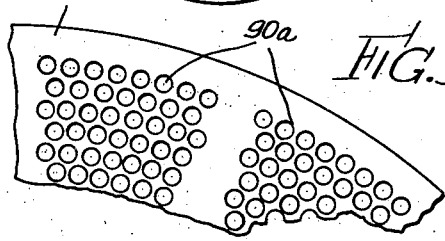
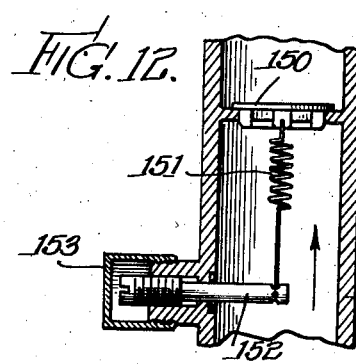
INVENTOR.
Richard R. Trexler
By: Loftus, Moore, Olson & Trexler
attys Patented July 16, 1946

2,404,258

UNITED STATES PATENT OFFICE 2,404,258

LIQUID DISPENSING APPARATUS

Richard R. Trexler, Evanston, Ill.

Application December 9, 1942, Serial No. 468,363

12 Claims. (Cl. 222—28)

This invention relates to fluid dispensing apparatus, and particularly to apparatus adapted to dispense liquids in measured quantities while simultaneously calculating the cost thereof at a given or selected cost per unit of volume.

It is an object of the invention to provide a fluid dispensing apparatus of improved construction and operating characteristics, and more particularly to provide improved means for calculating the cost of the fluid or liquid dispensed.

In accordance with the principles of the invention cost calculating fluid variator means is disposed directly in the flow line of the dispensed fluid, said means controlling the flow of fluid within a selected portion of the line in a manner so as to enable the accurate cost calculation thereof at variable and selected prices per unit of measure.

Further objects of the invention are to provide cost calculating means, in apparatus of the type stated, which may be more economically constructed, and which is accurate in operation and readily adjustable to effect cost calculations at variable and selected unit prices.

Another object of the invention, in one of its aspects, is to provide in a fluid variator structure, means whereby the adjustment of a single member will effect the corresponding accurate adjustment of the fluid variator mechanism throughout its selected range of price adjustment.

A still further object of the invention is to provide for the cost calculation of the fluid dispensed, in a fluid dispensing apparatus, without varying the operating characteristics or displacement mechanism of the meters provided, and without the provision of mechanical variator means or other cumbersome mechanism.

Another object of the invention is to provide in apparatus of the type stated, for a minimum load upon the meter or meters provided, whereby to facilitate accurate meter operation, and also to enable the use of less expensive and more readily constructed metering units.

Various other objects, advantages and features of the invention will be apparent from the following specification when taken in connection with the accompanying drawings, wherein certain preferred embodiments of the invention are set forth for purposes of illustration.

In the drawings, wherein like reference numerals refer to like parts throughout:

Fig. 1 is a general assembly view of a liquid dispensing apparatus constructed in accordance with the principles of the invention, parts of the apparatus housing being broken away to better illustrate certain of the structural elements;

Fig. 2 is a partial side and sectional view of the apparatus shown in Fig. 1, and taken on the line 2—2 thereof;

Fig. 3 is a horizontal sectional view through the apparatus of Fig. 1, on the line 3—3 thereof;

Fig. 4 is a detail horizontal sectional view, on an enlarged scale, of the fluid variator structure, and taken on the lines 4—4 as indicated in Fig. 1 and Fig. 5;

Fig. 5 is a detail vertical sectional view of the fluid variator on the line 5—5 of Fig. 4;

Fig. 6 is a detail sectional view of a control valve structure optionally but preferably forming a part of the structure of Fig. 1;

Fig. 7 is a detail sectional view of a portion of the valve mechanism of Fig. 6, on the line 7—7 thereof;

Fig. 8 is a sectional view similar to Fig. 4, but illustrating a modified form of fluid variator structure;

Fig. 9 is a partial detail view of a portion of the apparatus of Fig. 8;

Fig. 10 is a view, also similar to Fig. 4, but showing another modified form of fluid variator structure, and taken on the line 10—10 of Fig. 11;

Fig. 11 is a partial view of a dispensing apparatus, utilizing the fluid variator structure of Fig. 10; and Fig. 12 is a view of a modified and more simplified form of control valve, which may be optionally used in substitution for the control valve of Fig. 6.

Referring more specifically to the drawings, and first to the embodiment of the invention illustrated in Figs. 1 to 7 inclusive, in Fig. 1 the dispensing apparatus illustrated may be of the general type ordinarily provided for the dispensing of gasoline for automotive vehicle use, although it is to be understood that the invention in its various aspects is not limited to apparatus of this character. The dispensing apparatus illustrated comprises an upstanding housing 10 adapted to be associated with an underground storage tank 11 containing the liquid 12 forming the supply source for the dispensing apparatus.

A dispensing pump 13 which may be of any conventional type, and provided with a by-pass valve or the like, draws the liquid 12 from the underground tank into the pump by means of a pump inlet pipe 14. The pump is driven by an electric motor or other suitable prime mover 15 through the intermediary of a belt 16 and associated pulleys 17 and 18. The motor is controlled by a switch 19 actuated by a rod 20 connected to the nozzle support 21 which is pivotally mounted upon the housing 10 and is adapted to be pivoted upwardly when the dispensing nozzle 22 is removed therefrom. The arrangement is such that when the nozzle support is pivoted upwardly, as stated, switch 19 is operated to energize the driving motor 15.

The dispensing pump 13 propels the dispensed liquid through an outlet pipe 25 into an air and vapor eliminator 26 which may be of conventional construction. An outlet pipe 27 leads from the air eliminator to a volume metering device 28. As illustrated, the meter 28 is of the nutating plate type, the construction of which will be well understood by those familiar with the art. However, it is to be understood that any sort of conventional meter may be employed. A nutating plate type meter has been illustrated because in accordance with the principles of the present invention, the register driving forces required of the meter are minimized, enabling the use of a relatively light and economical type meter, such as shown. As will be understood, the meter may be provided with suitable calibrating means, to insure its accuracy of measurement.

From the meter 28 the dispensed liquid passes through an outlet pipe 29 into a fluid variator 30, the construction of which will be hereinafter described. Within the fluid variator the fluid or liquid flow may be divided, and passes therefrom through a pair of parallel pipes or conduits 31 and 32. A cost metering device 33 is associated with the pipe 31, to effect the measurement of liquid or fluid passing therethrough. From the meter 33 the fluid measured thereby passes through an outlet pipe 34 joining the fluid from the pipe 32 within a T connection 35. The combined fluids from both pipes 31 and 32 flow outwardly through the pipe 36 to a sight gauge 37, and then to the usual flexible hose 38 and dispensing nozzle 22 provided with a manual control valve 39.

As illustrated, the cost meter 33 is also of the nutating plate type, as in the case of the volume meter 28, for the reasons heretofore pointed out. However, as in the case of the volume meter, it is to be understood that any conventional type of meter may, if desired, be used. A control valve structure as indicated at 40, may also be optionally provided in the pipe 32, thus dividing the pipe 32 into separate sections 32 and 32'. The purpose and function of this control valve structure will also be later described.

The volume meter 28 is arranged to drive a shaft 43 suitably connected by drive connections 44 to drive a volume register 45 provided at the upper front portion of the housing. Similarly the cost meter 33 is arranged to drive a shaft 46 connected by means of drive connections 47 to drive a cost register 48. As shown in Fig. 2, the volume and cost registers may be duplicated on the opposite face of the apparatus, as indicated at 49, these registers also being drivingly connected to the meter shafts 43 and 46, for simultaneous operation with the registers 45 and 48.

The fluid variator structures, and their arrangement with the other elements of the system, are shown in Figs. 1, 2, 3, 4 and 5. The fluid variator, generally indicated by the numeral 30 in Figs. 2, 3, 4 and 5, comprises a two-part casing or housing, viz., an upper housing portion 51 and a lower housing portion 52 flanged and connected together by means of bolts or screws 53.

The lower casing portion 52 carries a fine screen 54, Fig. 5, held in position by screws 55. This screen effects an even distribution of the liquid received into the fluid variator from the pipe 29, causing the fluid to tend to move upwardly through the variator with substantially uniform velocity over its entire horizontal cross sectional area.

As best shown in Figs. 4 and 5, the upper casing portion 51 of the fluid variator is provided with a face plate portion 56, forming a horizontally extending barrier across the entire casing structure. Formed integral with the plate 56 is a vertically extending baffle wall 57, this baffle wall effecting a separation of the upper casing portion 51 into two separated chambers 58 and 59 associated, respectively, with the pipe 31 leading to the cost meter 33, and the pipe 32. The baffle wall 57 is provided with three enlarged bearing bosses 60, 61 and 62, at preselected spaced points along its length, and the plate 56 is provided with arcuate slots 63 and 64 concentric with the boss 60, with arcuate slots 65 and 66, concentric with the boss 61, and with arcuate slots 67 and 68, concentric with the boss 62. The ends of these arcuate slots project up to but not through the plane of the vertically disposed baffle wall 57. In other words, the adjacent ends of the slots are spaced apart by a distance equal to the thickness of the baffle wall 57.

The separator plate or wall 56 is provided with three circular raised or embossed portions 70 through which the pairs of slots are cut, whereby to provide bearing surfaces for engagement by the variator discs presently to be described. There are three of these embossed or raised portions 70, one for each pair of slots, and each of the embossed portions forms a complete circle whereby to provide complete circular and fluid-tight bearing surfaces for the variator discs. The pipes or conduits 31 and 32 are indicated by dot and dash lines in Fig. 4 to diagrammatically show the location of these outlet pipes, dot and dash lines being used to indicate that the pipes are physically arranged in the structure, above the section line along which Fig. 4 is taken.

Referring further to Figs. 4 and 5, three variator discs as indicated at 73, 74 and 75 are associated, respectively, with the slot pairs 63—64, 65—66 and 67—68; these discs being keyed or otherwise fixed to the ends of shafts 76, 77 and 78 journaled in the bearing bosses 60, 61 and 62. The manner in which the disc 74 is keyed to the end of its associated shaft 77 is shown in Fig. 5, the connection comprising a key 80 and a nut 81 threaded onto the end of the shaft for holding the disc in position. Similar mounting means may be employed for securing the other discs 73 and 75, respectively, onto their associated shafts 76 and 78. As also best shown in Fig. 5, each of the variator discs is preferably provided with a bearing washer as shown at 82, of neoprene or the like, for fluid-tight bearing engagement against the associated plate boss 70. A compression spring 83, Fig. 5, bearing at its upper end against a collar 84 and at its lower end against a packing gland member 85 maintains the washers 82 and bosses 70 in fluid-tight bearing engagement. The particular spring 83 illustrated in Fig. 5 is associated with the shaft 77 and its variator disc 74, but it is to be understood that similar means is provided for each of the variator disc structures. The collar 84 is adjustable on the shaft 77 by means of a set screw 86 whereby to properly control the compression of the spring 83. Also, the packing gland member 85 is threaded into a boss 87 provided as a part of the casing 51, whereby to effect the compression of a packing 88, preventing liquid leakage along the shaft 77. As indicated, similar means is provided for each of the three variator disc shafts.

Disc 73, which is the "tens" variator disc, is provided with nine openings 90. Disc 74, which is the "units" variator disc, is provided with nine openings 91 and disc 75, which is the "tenths" variator disc, is provided with nine openings 92. The openings or holes 91 in disc 74 are of such size or area that they will permit the passage of ten times as much liquid as will pass through the holes 92 of the disc 75, at the same fluid or liquid pressures. Similarly, the holes 90 in disc 73 are of such size that they will permit the passage of ten times as much liquid as the holes 91, or one hundred times as much as the holes 92. Each of the variator discs is independently rotatably adjustable, the arrangement being such that its nine holes may be exclusively on one side of the baffle wall 57, or on the other side thereof, or divided in any desired proportion. Those holes which are set to discharge into the variator chamber 58 transmit fluid or liquid which will be measured by the cost meter 33, which is directly connected to the cost register. Accordingly, it will be seen that the setting of the variator discs will determine the proportion of the fluid or liquid which will be measured by the meter 33, in relation to that which is by-passed through the pipe 32. Adjustment of the discs in accordance with the selected unit price per unit of volume will therefore effect the proper actuation of the cost meter 33 and the associated directly connected cost register, in a manner to cause the cost register to accumulate and register the proper cost of the dispensed fluid at the selected unit price per unit of volume. For example, in Fig. 4 the variator discs are set to compute the dispensed liquid at a unit price per gallon of 24.3 cents, the unit price indicated on the "price per gallon" register 95, Fig. 1. The variator illustrated can effect the calculation of costs at unit prices from one-tenth of a cent per gallon to 99.9 cents per gallon, although in ordinary usage the variator is not called upon to effect calculation over this wide a price variation or range.

The means for effecting the adjustments of the discs are best shown in Figs. 1, 2, 3 and 5. As shown in Fig. 5, the upper end of shaft 77 is provided with a bevel gear 96 meshing with a bevel gear 97 fixed to a shaft 98 which shaft, as best shown in Fig. 3, projects outwardly through the side of the housing 10 and is provided with an operating knob 99. Similar means is provided for each of the variator discs, the adjustment shaft for the "tens" disc 73 being indicated at 100 in Fig. 3, and the adjustment shaft for the "tenths" disc being indicated at 101. Shaft 100 is provided with an operating knob 102 and shaft 101 is provided with an operating knob 103. Sprockets 104, 105 and 106 are provided, respectively, on the shafts 100, 98 and 101, these sprockets being connected by chains 107, 108 and 109, Fig. 2, so as to effect the actuation of the adjustable dials of the price per gallon register 95 provided on the front of the housing, and also preferably a duplicate price per gallon register 110 on the rear housing face. To this end the chain 107 for the "tens" shaft 100 is arranged to actuate a sprocket 111 connected by means of chains 112 and 113 to the "tens dials" of the indicators 95 and 110. Similar connections, not shown, are provided between the "cents" chain 108 and the "cents" register dials, and between the "tenths" chain 109 and the "tenths" register dials. Accordingly, it will be seen that selective adjustment of the knobs 102, 99 and 103 effects the corresponding adjustment of the variator discs, and the simultaneous adjustment of the dials of the price per gallon registers.

To insure uniformity of action within the casing of the fluid variator, and to insure uniformity of operation of the variator disc holes on either side of the baffle wall 57, in certain instances it may be desirable to insure equalized pressure conditions within the chambers 58 and 59. One preferred arrangement to effect such result is illustrated in Figs. 6 and 7. As shown, the pipe or conduit 31 leading to the meter 33 is provided with a T fitting 116 to the open end of which is secured a plate 117 forming one of the plate elements of a diaphragm structure generally indicated by the numeral 118. The plate 117 cooperates with another plate 119, the two plates being peripherally secured together by bolts 120 to thereby grip an interposed flexible diaphragm element 121 of neoprene or the like.

Interposed in the pipe 32, between the pipe sections 32 and 32' is a fitting comprising a main body 122 and an auxiliary body or head portion 123 flanged and secured to the main body 122 by securing bolts 124. A plate member 125 provided with openings for the passage of fluid is held in position by the fitting head 123. A second plate member 126, also provided with openings for the passage of fluid, is laterally shiftable within the conduit by means of a link 127 pivotally mounted upon a cross bar 128 formed as a part of the main fitting body 122. The link 127 is pivotally connected to and operated by a link 129, the end of which is anchored to the diaphragm member 121. It is to be understood that the fitting body 122 is threadedly connected to the plate 119 of the diaphragm device in a fluid-tight threaded connection.

Normally, when the structure is in operation, the openings in the plates 125 and 126 are sufficiently out of alinement or out of phase so as to impart a slight resistance to fluid flow within the conduit 32—32', equal to the pressure drop normally occurring within the cost meter 33, thereby maintaining equal pressure conditions in the variator chambers 58 and 59. In the event that the cost meter should encounter increased resistance, pressure within the pipe 31 would tend to increase, thereby shifting the diaphragm element 121 to the right as seen in Fig. 6, shifting the plate 126 to the right, and thereby shifting the alined openings in the plates 125 and 126 further out of phase to correspondingly increase the pressure within the pipe 32 so as to maintain equal pressures within the chambers 58 and 59. Conversely, if the pressure within pipe 31 tends to decrease, the plate 126 is shifted to the left as seen in Fig. 6, moving the alined openings in the plates 125 and 126 further into phase to correspondingly decrease the pressure in pipe 32. By this means equalized pressures within the chambers 58 and 59 at all times is assured.

The operation of the structure is believed to be clear. As the nozzle support 21 is raised energizing the motor 15 by means of switch 19, pump 13 operates to propel fluid through the dispensing line. The entire volume of liquid flow is measured by the volume meter 28 directly connected to operate the volume register 45. In the fluid variator 30 the fluid is divided in accordance with the desired unit price per unit of volume, part of the flow passing through the pipe 31 to be measured by the cost meter 33, and part of the flow being by-passed around the cost meter through the pipe 32, the flows being combined within the fitting 35 to be thereby dispensed from the nozzle 22 in the usual manner. By means of the control valve structure of Fig. 6, equalized pressure conditions are maintained within the fluid variator chambers 58 and 59, and by means of the adjustment knobs 99, 102 and 103, Fig. 3, the variator discs may be preset so that the cost calculation takes place at the selected price per gallon.

In accordance with the structure provided, the meters are subjected to a minimum driving load. Meter inertia is thus minimized and accuracy is promoted. Also, meters of lower cost type may be used. No adjustment mechanism of the meter is provided for varying or modifying the displacement or operating characteristics in accordance with the price changes, and costly and cumbersome mechanical variator mechanisms are eliminated.

In Fig. 8 a modified form of variator structure is provided. In this instance the "tens" variator disc 73a instead of being provided with large openings as in the embodiment previously described, is provided instead with blocks of small openings, to effect the same functions and purposes. More specifically, the "tens" variator disc 73a is in this instance provided with nine blocks of openings 90a, there being one hundred openings or holes in each block. These holes are the same size as the holes 92a in the "tenths" disc 75a. Similarly, the "cents" disc 74a is provided with nine blocks of holes 91a, there being ten holes in each block, and the holes being of the same size as the holes 92a of the disc 75a. Accordingly, it will be seen that each block of holes in the disc 74a will effect the passage of ten times the amount of fluid which will pass through a given hole 92a, whereas each block of holes 90a of the disc 73a will effect the passage of one hundred times the amount of fluid as one hole 92a, under the same pressure conditions. Accordingly, it will be seen that the function and operation of the variator thus provided is similar to that described in connection with Fig. 4 except that in this instance all of the holes or openings within the variator discs are of the same size insuring absolute uniformity of operation, with respect to each other, under all possible varying conditions of pressure and rates of fluid flow within the dispensing line. In Fig. 9 the detail of the arrangement of the holes in the disc 73a is illustrated.

In Figs. 10 and 11 a variator arrangement is illustrated wherein a single variator disc is employed to effect price changes throughout the desired price range. In this instance a single variator disc 135 is provided, said disc having a continuous concentric slot 136 of uniform section formed therein. As this slot is progressively moved from one side to the other of the baffle wall 57b, it will be seen that a progressively increasing or decreasing amount of fluid, as the case may be, is transmitted to the pipe line 31b to be measured by the cost meter arranged therein, whereby to effect variable cost calculations in accordance with the principles of the invention. It is to be understood that the plate 56b, as in the embodiments previously described, is in this instance provided with slots 137 and 138 for cooperation with the disc slot 136.

Referring to Fig. 11, the single shaft 140 upon which the disc 135 is carried, is in this instance provided with a worm gear 141 cooperating with a worm 142 secured on the end of an adjustment shaft 143. An adjustment knob 144 is provided on the opposite end of the shaft 143. A single indicator dial 145 cooperating with a fixed index pointer 146 is secured to the upper end of shaft 140.

The arrangement of the parts is such that as the disc slot 136 is in position to begin the initial introduction of fluid into the chamber 58b, the zero indication is exhibited on the dial 145 in alinement with the fixed frame or housing pointer 146. As the dial 145 reaches a position to indicate the dispensing of the liquid, at one-tenth cent per gallon, the slot 136 will be in position to deliver one part of the dispensed fluid into the chamber 58b and the other nine hundred and ninety-eight parts into the chamber 59b, as will be clear from what has heretofore been pointed out. Adjustment of the single knob 144 effects price calculation throughout the desired range of adjustment, the price per gallon to which the variator is set being indicated by the indicator structure 145—146.

In Fig. 12 a modified form of control valve, which may be used in place of the structure shown in Figs. 6 and 7, is illustrated. In this instance the conduit 32c is provided with a spring controlled relief valve 150. More specifically, a tension spring 151 normally urges the valve into seated position against the fluid flow as indicated by the arrow. One end of the spring is connected to the valve and the other end of the spring is adapted to be anchored to and wrapped around a rotatable adjustment screw 152. Rotation of the adjustment screw 152 varies the tension of the spring 151, thus varying the pressure drop which will be effected by the passage of the fluid through the relief valve. A cap 153 covers the end of the adjustment screw 152, thus preventing unauthorized operation thereof. In accordance with this form of structure, the valve 150 is adjusted to effect a pressure drop corresponding to the resistance encountered by the cost meter in its normal operation, thus maintaining equalized pressures within the outlet chambers of the fluid variator.

It is to be understood that while the opening or openings in the variator disc or discs in the several embodiments operate as flow control orifices, the collective area thereof is in each instance sufficiently large so as to proudce no substantial impediment to the liquid flow therethrough even when the pump 13 is delivering at its maximum dispensing rate. It will also be understood that the openings in the discs 125, 126, Fig. 6, when in full alignment, and the action of the valve 150, Fig. 12, when the spring 151 is at a minimum tension, are such as to produce no substantial pressure drop even when the pipe 32 or the pipe 32c, as the case may be, is transmitting substantially the entire liquid flow.

It is obvious that various changes may be made in the specific embodiments of the invention set forth for purposes of illustration without departing from the spirit of the invention. The invention is accordingly not to be limited to the specific embodiments shown and described, but only as indicated in the following claims.

The invention is hereby claimed as follows:

1. Fluid dispensing apparatus comprising a dispensing line adapted to be connected to a source of fluid supply, said dispensing line terminating in a dispensing outlet, metering means for metering a portion of the fluid flow within the dispensing line, a cost register connected to the meter for registering the cost of the fluid dispensed, and fluid engaged means calibrated in accordance with the unit cost of the fluid dispensed per unit of volume for controlling said metering means and thereby the cost register, said calibrated means being variable in accordance with unit cost while the displacement of the meter remains unchanged.

2. Fluid dispensing apparatus comprising a dispensing line adapted to be connected to a source of fluid supply, said dispensing line terminating in a dispensing outlet, means to propel fluid through the dispensing line, cost register means for registering the cost of the fluid dispensed, and register operating mechanism including means calibrated in accordance with the unit cost of the fluid dispensed per unit of volume for variably proportioning the fluid flow within a portion of the dispensing line in respect to the total fluid flow to control the cost register.

3. Fluid dispensing apparatus comprising a dispensing line adapted to be connected to a source of fluid supply, said dispensing line terminating in a dispensing outlet, means to propel fluid through the dispensing line, cost register means for registering the cost of the fluid dispensed, a portion of said dispensing line being provided with conduits in parallel for collectively transmitting the fluid flow, and register operating mechanism including means calibrated in accordance with the unit cost of the fluid dispensed per unit of volume for variably proportioning the flow within said parallel conduits to control the cost register.

4. Fluid dispensing apparatus comprising a dispensing line adapted to be connected to a source of fluid supply, said dispensing line terminating in a dispensing outlet, means to propel fluid through the dispensing line, cost register means for registering the cost of the fluid dispensed, and register operating mechanism including means calibrated in accordance with the unit cost of the fluid dispensed per unit of measure for controlling the fluid flow within a portion of the dispensing line in accordance with the unit cost of the fluid dispensed per unit of measure.

5. Fluid dispensing apparatus comprising a dispensing line adapted to be connected to a source of fluid supply, said dispensing line terminating in a dispensing outlet, a metering device for metering fluid flow within the dispensing line, a register connected to the meter for registering a function of the fluid dispensed, a portion of said dispensing line being provided with conduits connected in parallel for collectively transmitting the dispensing fluid flow, said meter being arranged in one of said conduits and the other of said conduits being in by-pass relation to the meter, and means calibrated in accordance with the function registered by the register for variably proportioning the fluid flow between said conduits to thereby control the operation of the register.

6. Fluid dispensing apparatus comprising a dispensing line adapted to be connected to a source of fluid supply, said dispensing line terminating in a dispensing outlet, a metering device for metering fluid flow within the dispensing line, a cost register connected to the meter for registering the cost of the fluid dispensed, and means calibrated in accordance with the unit cost of the fluid dispensed per unit of volume for controlling the fluid flow to the meter to thereby control the operation of the register.

7. Fluid dispensing apparatus comprising a dispensing line adapted to be connected to a source of fluid supply, said dispensing line terminating in a dispensing outlet adapted to transmit the entire fluid flow within the dispensing line, a first meter arranged in the dispensing line for metering the entire dispensing fluid flow therein, a register connected to said meter, a second meter connected to said dispensing line for metering a part only of the dispensing fluid flow therethrough, a register connected to said second meter, and means calibrated in accordance with the function registered by at least one of said registers for proportioning the flow between the meters.

8. Fluid dispensing apparatus comprising a dispensing line adapted to be connected to a source of fluid supply, said dispensing line terminating in a dispensing outlet, a meter arranged in said dispensing line for metering the entire dispensing flow therethrough, a register connected to said meter, a portion of said dispensing line being provided with conduits connected in parallel adapted to collectively transmit the dispensing fluid flow, a second meter arranged in one of said conduits and the other of said conduits being in by-pass relation to said second meter, a second register connected to said second meter, and a control device in the dispensing line for proportioning the fluid flow between said parallel conduits.

9. A fluid dispensing apparatus as defined in claim 8, wherein the register connected to the first meter is a volume register, and wherein the register connected to the second meter is a cost register, and wherein said control device comprises a fluid variator mechanism calibrated in accordance with the unit cost of the fluid dispensed per unit of measure.

10. Fluid dispensing apparatus comprising a dispensing line adapted to be connected to a source of fluid supply, said dispensing line terminating in a dispensing outlet, metering means for metering the fluid flow within the dispensing line, a cost register connected to the metering means for registering the cost of the fluid dispensed, and means calibrated in accordance with the unit cost of the dispensed fluid per unit of measure and disposed in the dispensing line for controlling the fluid flow to the meter to thereby control the cost register, said calibrated means comprising a single cost calibrated member.

11. Fluid dispensing apparatus comprising a dispensing line adapted to be connected to a source of fluid supply, said dispensing line terminating in a dispensing outlet, a metering device for metering fluid flow within the dispensing line, a register connected to the meter for registering a function of the fluid dispensed, a portion of said dispensing line being provided with conduits connected in parallel for collectively transmitting the dispensing fluid flow, said meter being arranged in one of said conduits and the other of said conduits being in by-pass relation to the meter, means calibrated in accordance with the function registered by the register for variably proportioning the fluid flow between said conduits to thereby control the operation of the register, and pressure control means for maintaining uniform pressure conditions within the corresponding portions of said parallel conduits.

12. Fluid dispensing apparatus comprising a dispensing line adapted to be connected to a source of fluid supply, said dispensing line terminating in a dispensing outlet, a metering device for metering fluid flow within the dispensing line, a cost register connected to the meter for registering the cost of the fluid dispensed, a portion of said dispensing line being provided with conduits connected in parallel for collectively transmitting the dispensing fluid flow, said meter being arranged at one of said conduits and the other of said conduits being in by-pass relation with the meter, means calibrated in accordance with the unit cost of the fluid dispensed per unit of volume for proportioning the fluid flow to the meter to thereby control the operation of the register, said calibrated means being operable to at least double the fluid flow to the meter, and pressure control means for maintaining uniform pressure conditions within corresponding portions of said parallel conduits.

RICHARD R. TREXLER.